US009014567B2

(12) United States Patent
Tan et al.

(10) Patent No.: US 9,014,567 B2
(45) Date of Patent: Apr. 21, 2015

(54) ELECTRONIC SYSTEM HAVING FANOUT OPTICAL BUSES

(75) Inventors: Michael Renne Ty Tan, Menlo Park, CA (US); Moray McLaren, Bristol (GB); Paul Kessler Rosenberg, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 127 days.

(21) Appl. No.: 13/877,641

(22) PCT Filed: Oct. 8, 2010

(86) PCT No.: PCT/US2010/052052
§ 371 (c)(1),
(2), (4) Date: Apr. 3, 2013

(87) PCT Pub. No.: WO2012/047233
PCT Pub. Date: Apr. 12, 2012

(65) Prior Publication Data
US 2013/0202313 A1    Aug. 8, 2013

(51) Int. Cl.
*H04B 10/278* (2013.01)
*G02B 6/43* (2006.01)
*H04B 10/80* (2013.01)

(52) U.S. Cl.
CPC .............. *H04B 10/278* (2013.01); *G02B 6/43* (2013.01); *H04B 10/803* (2013.01)

(58) Field of Classification Search
USPC .................................. 398/141–145; 385/24
See application file for complete search history.

(56) References Cited

U.S. PATENT DOCUMENTS

| 6,229,933 | B1 | 5/2001 | Curzio et al. | |
|---|---|---|---|---|
| 6,693,901 | B1 | 2/2004 | Byers et al. | |
| 6,814,582 | B2 | 11/2004 | Vadasz et al. | |
| 7,206,888 | B2 | 4/2007 | Byers et al. | |
| 7,308,205 | B2 * | 12/2007 | Ozeki et al. | 398/164 |
| 2004/0234270 | A1 * | 11/2004 | Nishie et al. | 398/141 |

(Continued)

FOREIGN PATENT DOCUMENTS

| CN | 1617000 A | 5/2005 |
|---|---|---|
| JP | 2003139985 | 5/2003 |

(Continued)

OTHER PUBLICATIONS

International Search Report and Written Opinion, Jul. 28, 2011, PCT Application No. PCT/US2010/052052.

(Continued)

*Primary Examiner* — David Payne
*Assistant Examiner* — Casey Kretzer
(74) *Attorney, Agent, or Firm* — Mannava & Kang (57) ABSTRACT

An electronic system includes a plurality of electronic nodes, each having a transmitter module and a plurality of receiver modules, in which the transmitter module is positioned at a same location with respect to the receiver modules in each of the electronic nodes, and a plurality of fanout optical buses, each fanout optical bus comprising a transmitter section, a plurality of receiver sections, and at least one substantially straight optical waveguide extending between the plurality of receiver sections, wherein each transmitter section is optically connected to a transmitter module of a respective one of the electronic nodes and wherein the receiver sections of each of the fanout optical buses is connected to respective ones of the receiver modules of the electronic nodes.

14 Claims, 5 Drawing Sheets

(56) References Cited

U.S. PATENT DOCUMENTS

2009/0003836 A1* 1/2009 Wang et al. .................. 398/156
2009/0027658 A1 1/2009 Beausoleil et al.
2009/0274467 A1 11/2009 Morris et al.

FOREIGN PATENT DOCUMENTS

| JP | 3937295 B2 | 6/2007 |
|----|------------|--------|
| TW | 396283 | 7/2000 |
| WO | WO-2010050915 A1 | 5/2010 |

OTHER PUBLICATIONS

Li, Yao, "Free-space optical bus-based WDMA interconnects for parallel computation", Proceedings of LEOS Annual meeting, pp. 588-589, Nov. 16-19, 1992.

Tang, S. et al., "Design limitation of highly parallel free-space optical interconnects based on arrays of vertical cavity surface-emitting laser diodes, microlenses, and photodetectors", Journal of Lightwave Technology, vol. 12, No. 11, pp. 1971-1975, Nov. 1994.

* cited by examiner

ELECTRONIC SYSTEM HAVING FANOUT OPTICAL BUSES

BACKGROUND

Backplanes are often employed in rack mounted systems to provide high speed interconnections between the electronic devices mounted in the racks. The backplanes are typically constructed of multi-layer circuit boards with conductive traces selectively routed to provide the high-speed interconnections. Currently, bus-based or fabric based backplanes are commonly used to provide the interconnections.

In bus-based backplanes, large sets of parallel signals are used to interconnect the electronic devices. Because the total throughput must be shared among all of the electronic devices along the bus-based backplane, there are practical limits on the maximum system throughput, which often limits reliability. In fabric based backplanes, a central high-speed fabric or hub is used to switch traffic between all of the electronic devices. The costs, however, associated with the fabric based backplanes tend to be relatively high because of the additional full central fabric required to implement this type of backplane.

BRIEF DESCRIPTION OF THE DRAWINGS

Embodiments are illustrated by way of example and not limited in the following figure(s), in which like numerals indicate like elements, in which.

DETAILED DESCRIPTION

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In other instances, well known methods and structures are not described in detail so as not to unnecessarily obscure the description of the embodiments.

Disclosed herein are an electronic system and a method for implementing the electronic system. The electronic system includes a plurality of electronic nodes, each of which includes a transmitter module and a plurality of receiver modules. The transmitter module in each of the electronic nodes is located at the same position with respect to the receiver modules. Thus, in one respect, each of the electronic nodes comprises identical electronic nodes. The electronic system also includes a plurality of fanout optical buses that each includes a transmitter section and a plurality of receiver sections. The transmitter and the receiver sections of the fanout optical buses include different configurations to accommodate for the positions in which the transmitter and receiver modules are located in the electronic nodes.

Through implementation of the electronic system and method disclosed herein, each of the electronic nodes is provided with its own dedicated fanout optical bus through which optical signals are sent to all of the electronic nodes connected to the fanout optical bus, which allows for all to all connectivity among the electronic nodes. In addition, the fanout optical buses are arranged to have relatively straight waveguide sections to thus enable communication of relatively strong optical signals through the fanout optical buses and for ease of manufacturing of the fanout optical buses. Furthermore, because the electronic nodes have common configurations, the electronic nodes may be arranged in an electronics rack in an arbitrary order, which makes implementation of the electronics system disclosed herein relatively easy. Moreover, the costs associated with obtaining electronic nodes having different configurations may be avoided.

Figure 1:
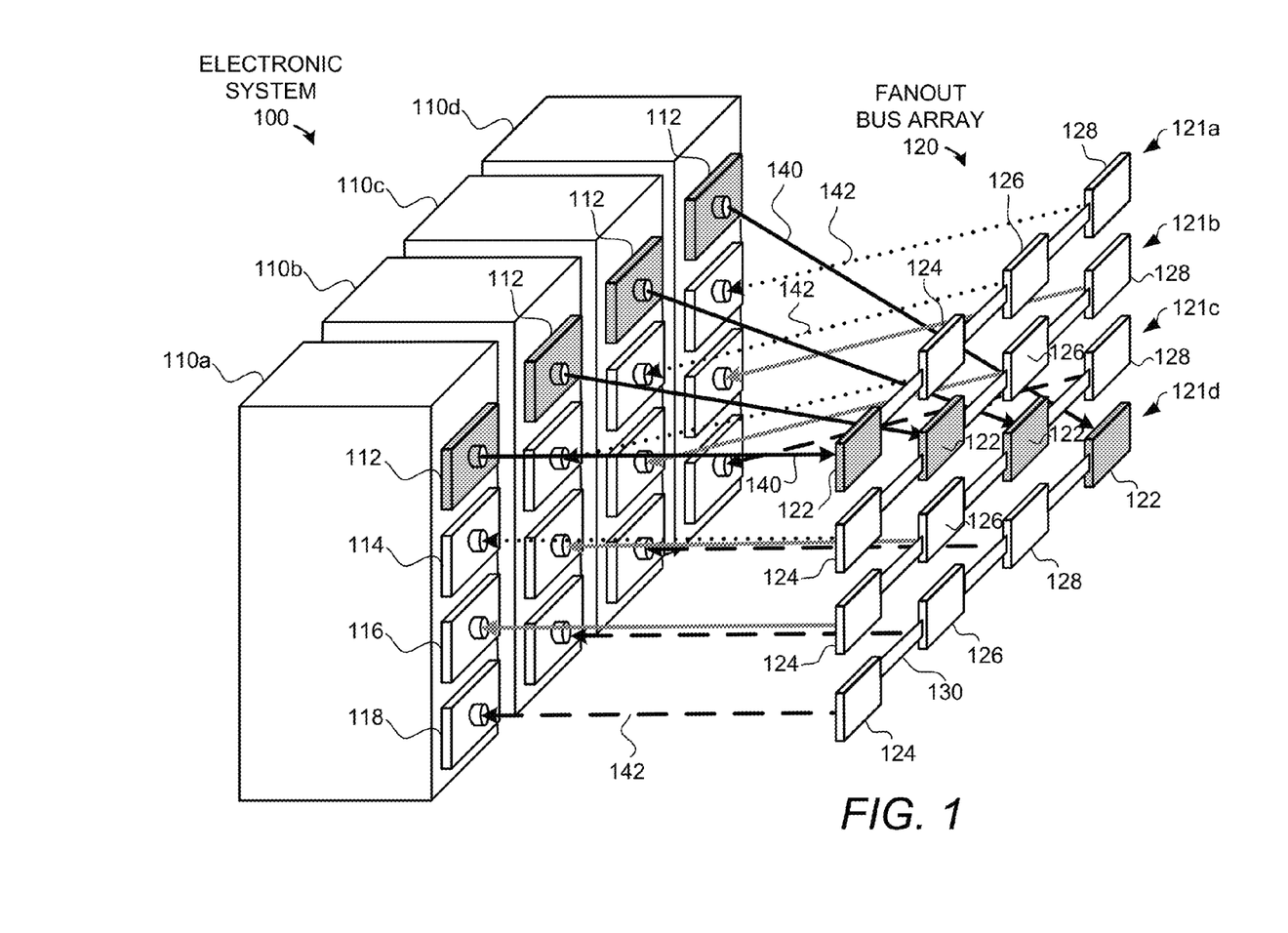
FIG. 1 depicts a simplified perspective view of an electronic system, according to an embodiment of the invention.

With reference first to FIG. 1, there is shown a simplified perspective view of an electronic system 100, according to an embodiment. It should be understood that the electronic system 100 depicted in FIG. 1 may include additional components and that some of the components described herein may be removed and/or modified without departing from a scope of the electronic system 100. It should also be understood that the components depicted in FIG. 1 are not drawn to scale and thus, the components may have different relative sizes with respect to each other than as shown therein.

As shown therein, the electronic system 100 includes a plurality of electronic nodes 110a-110d, each of which is equipped with a transmitter module 112 and a plurality of receiver modules 114-118. The transmitter modules 112 have been depicted with shading to better distinguish the transmitter modules 112 from the receiver modules 114-118. Although not explicitly depicted in FIG. 1, each of the electronic nodes 110a-110d may also include additional hardware components to process the signals prior to transmission of optical signals through the transmitter modules 112 or after receipt of optical signals through the receiver modules 114-118. For instance, the electronic nodes 110a-110d may include optical engines for converting electrical signals into optical signals and vice versa.

Generally speaking, each of the electronic nodes 110a-110d comprises a suitable device configured to transmit signals to and receive signals from each of the other electronic nodes 110a-110d through the transmitter modules 112 and the receiver modules 114-118. In one example, the electronic nodes 110a-110d comprise electronic devices configured to support one or more technologies, such as, processors, memories, power supplies, etc. In another example, the electronic nodes 110a-110d comprise relatively larger scale electronic devices, such as, servers, compute blades, routers, switches, etc. In a further example, the electronic nodes 110a-110d comprise even larger scale electronic devices, such as, electronics racks or cabinets.

In any regard, and as shown in FIG. 1, the electronic nodes 110a-110d are similarly configured with respect to each other such that the transmitter modules 112 in each of the electronic nodes 110a-110d is positioned at a same location with respect to the receiver modules 114-118 in each of the electronic nodes 110a-110d. In one regard, therefore, a single type of electronic node 110a-110d, for instance, having the same part number, may be employed in the electronic system 100. In FIG. 1, the transmitter modules 112 have been depicted as being located at the topmost positions in each of the electronic nodes 110a-110d for purposes of illustration and not of limitation. As such, the transmitter modules 112 may be positioned at any location with respect to the receiver modules 114-118 without departing from a scope of the electronic system 100.

Also shown in FIG. 1 is a fanout optical bus array 120 formed of a plurality of fanout optical buses 121a-121d that enables all-to-all communication between the electronic nodes 110a-110d. In one example, the fanout optical bus array 120 comprises a backplane of the electronic nodes 110a-110d. In another example, the fanout optical bus array 120 is positioned in front of the electronic nodes 110a-110d.

Each of the fanout optical buses 121a-121d includes a transmitter section 122 and plurality of receiver sections 124-128. In addition, each of the transmitter sections 122 is depicted as being connected to each of the receiver sections 124-128 in each of the fanout optical buses 121a-121d by one or more optical waveguides 130. Thus, for instance, a single optical waveguide 130 may connect the transmitter section 122 and the receiver sections 124-128 of a particular fanout optical bus 121a. Alternatively, multiple optical waveguides 130 may connect one or more of the transmitter section 122 and the receiver sections 124-128 of a particular fanout optical bus 121a. In either example, the transmitter sections 122 and the receiver sections 124-128 in each of the fanout optical buses 121a-121d may be arranged in a substantially straight line with respect to each other, to thus enable the optical waveguides 130 to have substantially straight configurations. As such, the fanout optical buses 121a-121d may be manufactured in a relatively easy manner and may be configured to communicate optical signals with relatively low signal loss.

As further shown in FIG. 1, the transmitter modules 112 of each of the electronic nodes 110a-110d is connected to a respective transmitter section 122 in a fanout optical bus 121a-121d through respective transmitter fiber ribbons 140. In addition, the receiver modules 114-118 of each of the electronic nodes 110a-110d are connected to respective receiver sections 124-128 of a fanout optical bus 121a-121d through respective receiver fiber ribbons 142. The receiver fiber ribbons 142 have been depicted with one of dashed lines, dotted lines, and gray lines to further distinguish the receiver fiber ribbons 142 from the transmitter fiber ribbons 140 and from each other. It should, however, be understood that the transmitter fiber ribbons 140 and the receiver fiber ribbons 142 may comprise the same or similar types of fiber ribbons through which optical signals may be communicated.

The transmitter sections 122 in each of the fanout optical buses 121a-121d is arranged in different locations with respect to each other along each of the fanout optical buses 121a-121d. More particularly, the transmitter section 122 in a first fanout optical bus 121a is located at a leftmost location of the first fanout optical bus 121a, the transmitter section 122 in a second fanout optical bus 121b is located at the second leftmost location of the second fanout optical bus 121b, and so forth. In this regard, when a signal is transmitted from the first electronic node 110a through the transmitter section 122 of the first fanout optical bus 121a, the signal is communicated through one or more optical waveguides 130 in the first fanout optical bus 121a to each of the receiver sections 124-128 of the first fanout optical bus 121a and into respective receiver modules 114 in the other electronic nodes 110b-110d.

As another example, when a signal is transmitted from the transmitter module 112 of the second electronic node 110b, the signal is transmitted through the transmitter section 122 of the second fanout optical bus 121b and split into two directions through one or more optical waveguides 130 of the second fanout optical bus 121b to thus communicate the signal to each of the receiver sections 124-128 of the second fanout optical bus 121b. In addition, the signal is communicated to each of the other electronic nodes 110a, 110c, and 110d through the optical fiber ribbons 142 connecting the receiver sections 124-128 of the second fanout optical bus 121b to the receiver modules 114 and 116 of the other electronic nodes 110a, 110c, and 110d. In this example, for instance, the transmitter section 122 of the second fanout optical bus 121b is configured to split the signal such that one-third of the signal is directed toward one of the receiver sections 124 and two-thirds of the signal is directed to toward the remaining receiver sections 126 and 128.

Although four electronic nodes 110a-110d and four fanout optical buses 121a-121d are shown in FIG. 1, it should be clearly understood that the electronic system 100 may include any number of electronic nodes 110a-110d and fanout optical buses 121a-121d without departing from a scope of the electronic system 100 disclosed herein. As such, only the physical limitations of the connections in the electronic nodes 110a-110d and the fanout optical buses 121a-121d limit the number of electronic nodes 110a-110d in the electronic system 100 disclosed herein.

Figure 2A:
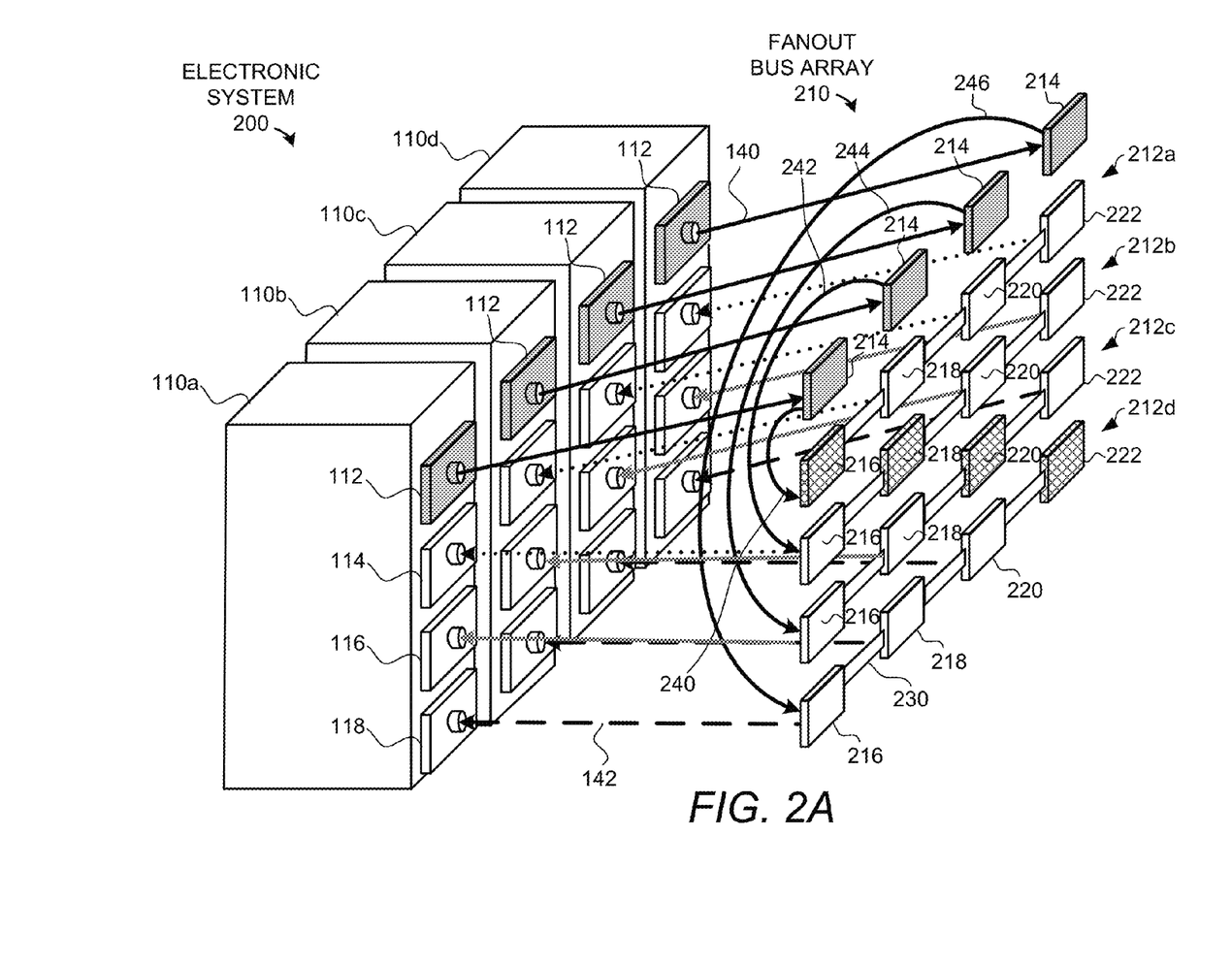
FIG. 2A depicts a simplified perspective view of an electronic system, according to another embodiment of the invention.
Figure 2B:
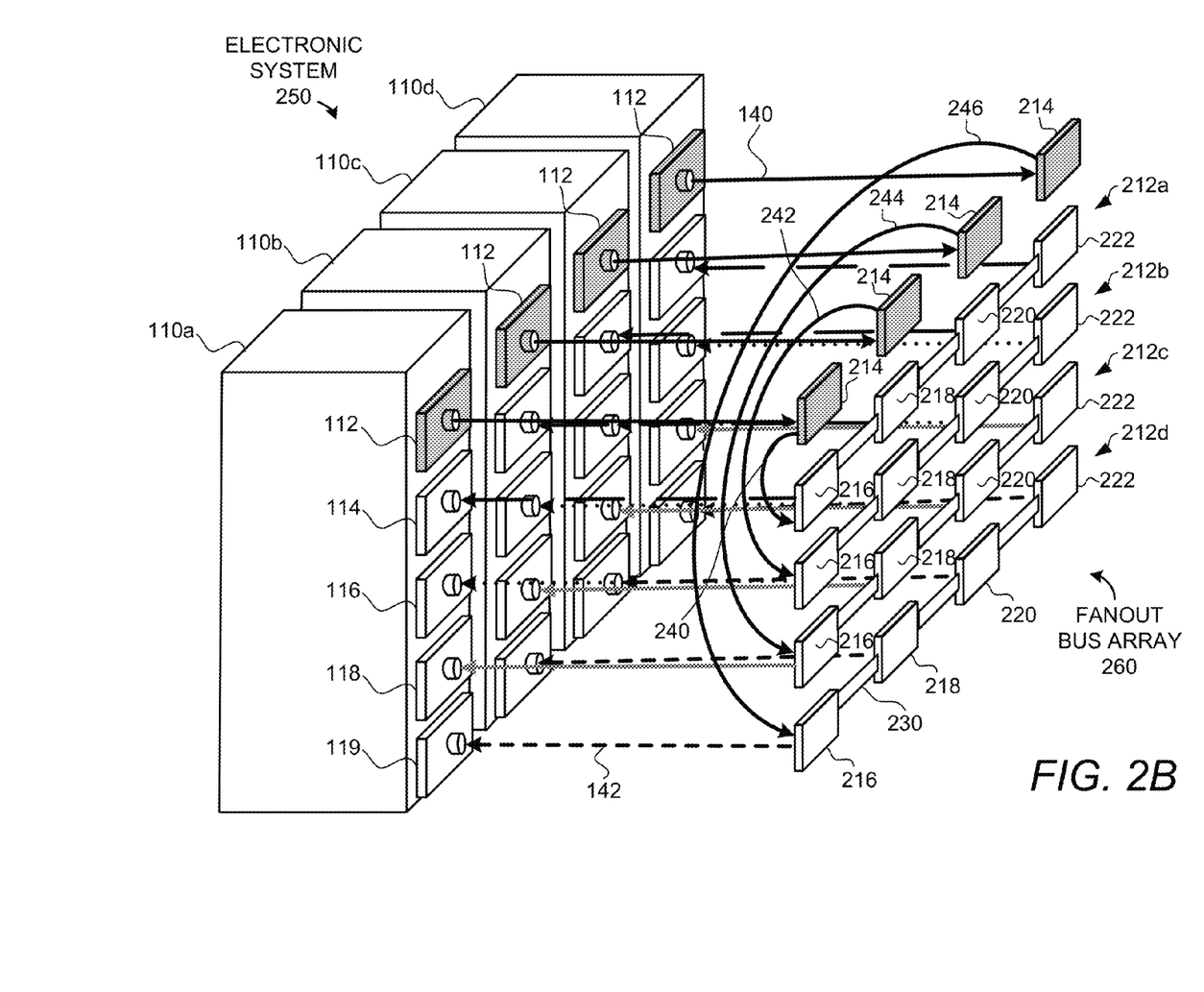
FIG. 2B depicts a simplified perspective view of an electronic system, according to a further embodiment of the invention.

Turning now to FIGS. 2A and 2B, there are shown simplified perspective views of electronic systems 200 and 250, according to embodiments. It should be understood that the electronic systems 200 and 250 respectively depicted in FIGS. 2A and 2B may include additional components and that some of the components described herein may be removed and/or modified without departing from scopes of the electronic systems 200 and 250. It should also be understood that the components depicted in FIGS. 2A and 2B are not drawn to scale and thus, the components may have different relative sizes with respect to each other than as shown therein.

The electronic systems 200 and 250 respectively depicted in FIGS. 2A and 2B include many of the same features as those discussed above with respect to the electronic system 100 depicted in FIG. 1. As such, detailed discussions of those elements in the electronic systems 200 and 250 having the same reference numerals as those in the electronic system 100 are omitted. Instead, the discussions of those common elements in FIG. 1 are applicable to the common elements in FIGS. 2A and 2B.

As shown in FIGS. 2A and 2B, fanout optical bus arrays 210 and 260 are each formed of a plurality of fanout optical buses 212a-212d. FIG. 2B also depicts the electronic nodes 110a-110d as having an additional receiver module 219. Each of the fanout optical buses 212a-212d includes a transmitter section 214 and a plurality of receiver sections 216-222. In addition, each transmitter section 214 is configured to communicate optical signals to the receiver section 216 of a respective fanout optical bus 212a-212d through respective fiber ribbons 240-246. Thus, the transmitter module 112 of the first electronic node 110a is connected to the transmitter section 214 of the first fanout optical bus 212a and the transmitter section 214 is connected to a first receiver section 216 of the first fanout optical bus 212a through a first fiber ribbon 240.

As also shown in FIGS. 2A and 2B, the receiver sections 216-222 in each of the fanout optical buses 212a-212d are connected to each other through one or more optical waveguides 230. Thus, for instance, a single optical waveguide 230 may interconnect the receiver sections 216-222 of a particular fanout optical bus 212a. Alternatively, multiple optical waveguides 230 may interconnect one or more of the receiver sections 212-222 of a particular fanout optical bus 212a. In either example, the receiver sections 212-222 in each of the fanout optical buses 212a-212d may be arranged in a substantially straight line with respect to each other to thus enable the optical waveguides 230 to have substantially straight configurations.

In FIG. 2A, in each of the fanout optical buses 212a-212d, there is a receiver section that is not connected to an electronic node 110a-110d. More particularly, in the first fanout optical bus 212a, a first receiver section 216 is not connected to a receiver module in the first electronic node 110a; in the second fanout optical bus 212b, a second receiver section 218 is not connected to a receiver module in the second electronic node 110b; in the third fanout optical bus 212c, a third receiver section 220 is not connected to a receiver module in the third electronic node 110c; and in the fourth fanout optical bus 212d, a fourth receiver section 222 is not connected to a receiver module in the fourth electronic node 110d. The receiver sections 216-222 in each of the fanout optical buses 212a-212d that are not connected to an electronic node 110a-110d have been shaded to further distinguish these receiver sections 216-222 from the other receiver sections. In an embodiment, the receiver sections that are not used to connect the fanout optical buses 212a-212d to respective electronic nodes 110a-110d are omitted from the respective fanout optical buses 212a-212d.

In FIG. 2B, however, each of the receiver sections 216-222 is connected to an electronic node 110a-110d.

As further depicted in FIGS. 2A and 2B, the transmitter sections 214 of each of the fanout optical buses 212a-212d are located at the same location with respect to each of the receiver sections 216-222. In this regard, signals transmitted from the transmitter modules 112 of the electronic nodes 110a-110d are routed through the transmitter sections 214 of respective fanout optical buses 212a-212d to the receiver sections 216 in a single direction and thus, the signals need not be split as is necessary in the embodiment depicted in FIG. 1. Thus, for instance, the strength of the signal communicated to each of the receiver sections 216-222 and onto the receiver modules 114-119 of the electronic nodes 110a-110d may be maintained at a relatively higher level than those attainable in the electronic system 100.

Although four electronic nodes 110a-110d and four fanout optical buses 212a-212d are shown in FIGS. 2A and 2B, it should be clearly understood that the electronic systems 200 and 250 may include any number of electronic nodes 110a-110d and fanout optical buses 212a-212d without departing from scopes of the electronic systems 200 and 250 disclosed herein. As such, only the physical limitations of the connections in the electronic nodes 110a-110d and the fanout optical buses 212a-212d may limit the number of electronic nodes 110a-110d in the electronic systems 200 and 250 disclosed herein.

According to an embodiment, each of the fanout optical buses 121a-121d in the electronic system 100 in FIG. 1 and the receiver sections 216-222 in each of the fanout optical buses 212a-212d in the electronic systems 200 and 250 in FIGS. 2A and 2B are formed on multiple waveguides. Thus, for instance, a first fanout optical bus 121a comprises a separate waveguide from the waveguide forming a second fanout optical bus 121b. In this regard, the optical waveguides 130, 230 of each of the fanout optical buses 121a-121d, 212a-212d do not cross each other at any point. As such, the optical waveguides 130, 230 of each of the fanout optical buses 121a-121d, 212a-212d may be positioned along a common plane on a common substrate.

In another example, two or more of the fanout optical buses 121a-121d and the receiver sections 216-222 of two or more of the fanout optical buses 212a-212d are formed on multi-layer waveguide systems, in which the optical waveguides (130, 230) in two or more of the fanout optical buses 121a-121d, 212a-212d cross each other. Multi-layer waveguide systems 300 and 400 according to two example embodiments are depicted in FIGS. 3 and 4, respectively.

Figure 3:
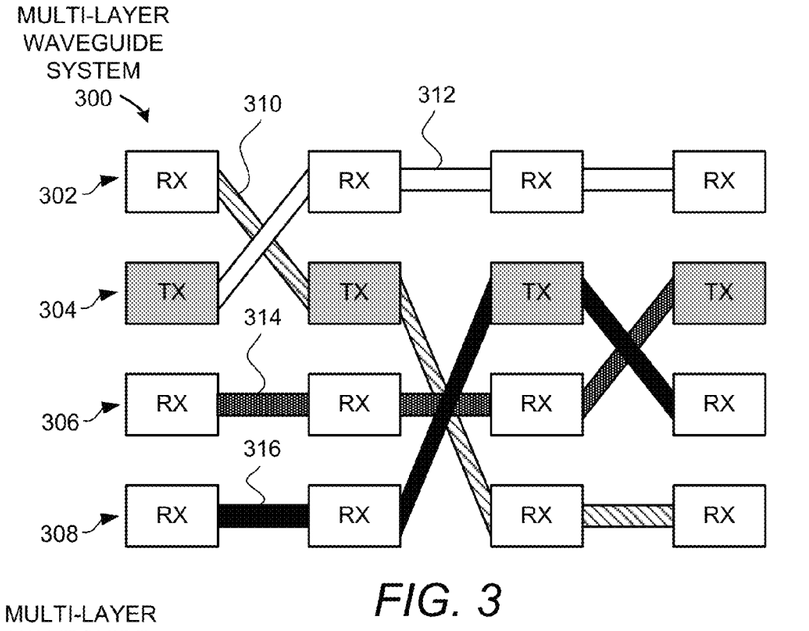
FIGS. 3 and 4, respectively, illustrate multi-layer waveguide systems, according to embodiments of the invention.

With reference first to FIG. 3, the multi-layer waveguide system 300 includes a plurality of fanout optical buses 302-308 formed of a transmitter section (labeled "TX") and plurality of receiver sections (labeled "RX"). In addition, the transmitter sections are arranged in the same locations with respect to the receiver sections in each of the fanout optical buses 302-308. Although not shown in FIG. 3, the transmitter sections may be connected to respective transmitter modules 112 and the receiver sections may be connected to respective receiver modules 114-118 of the electronic nodes 110a-110d in manners similar to those discussed above with respect to FIG. 1.

In contrast to the fanout optical buses 121a-121d in FIG. 1, the fanout optical buses 302-308 are not arranged in a relatively straight line. Instead, each of the fanout optical buses 302-308 includes optical waveguides 310-316 formed of one or more sections that cross each other at one or more locations. For instance, a first fanout optical bus 302 includes an optical waveguide 310 that crosses an optical waveguide 312 of a second fanout optical bus 304 at one location and an optical waveguide 314 of a third fanout optical bus 306 at another location. According to an example, the optical waveguide 310 of the first fanout optical bus 302 and the optical waveguide 312 of the second fanout optical bus 304 are formed on a common two-layer hollow metal waveguide. Thus, for instance, the first optical waveguide 310 is formed on a first layer and the second optical waveguide 312 is formed on a second layer of the common two-layer hollow metal waveguide. In addition, the third optical waveguide 314 and the fourth optical waveguide 316 are formed on separate layers of another common two-layer hollow metal waveguide.

Figure 4:
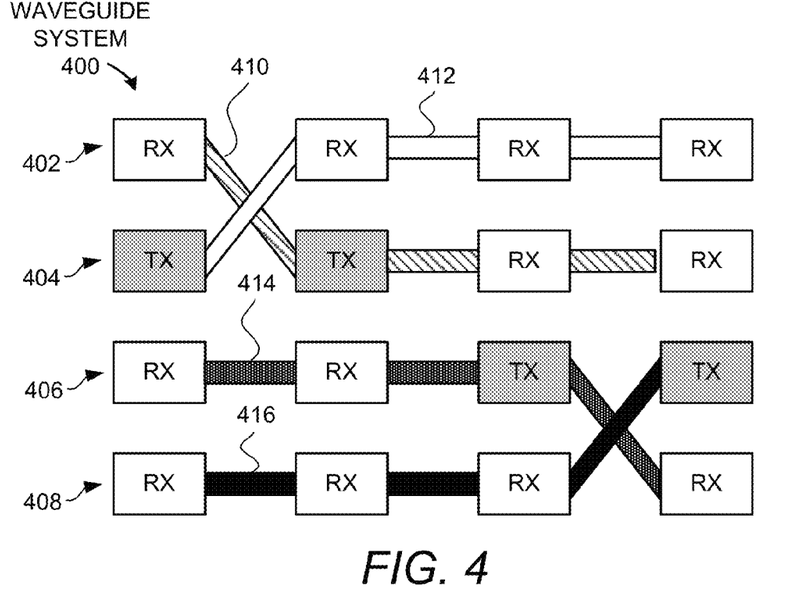

With reference now to FIG. 4, the multi-layer waveguide system 400 includes a plurality of fanout optical buses 402-408 formed of a transmitter section (labeled "TX") and plurality of receiver sections (labeled "RX"). Although not shown in FIG. 4, the transmitter sections may be connected to respective transmitter modules 112 and the receiver sections may be connected to respective receiver modules 114-118 of the electronic nodes 110a-110d in manners similar to those discussed above with respect to FIG. 1.

In contrast to the fanout optical buses 121a-121d in FIG. 1, the fanout optical buses 402-408 depicted in FIG. 4 are not arranged in a relatively straight line. Instead, each of the fanout optical buses 402-408 includes optical waveguides 410-416 formed of one or more sections that cross each other at one or more locations. For instance, a first fanout optical bus 402 includes an optical waveguide 410 that crosses an optical waveguide 412 of a second fanout optical bus 404 at one location. In addition, a third fanout optical bus 406 includes an optical waveguide 414 that crosses an optical waveguide 416 of a fourth fanout optical bus 408 at one location. According to an example, the optical waveguide 410 of the first fanout optical bus 402 and the optical waveguide 412 of the second fanout optical bus 404 are formed on a common two-layer hollow metal waveguide. Thus, for instance, the first optical waveguide 410 is formed on a first layer and the second optical waveguide 412 is formed on a second layer of the common two-layer hollow metal waveguide. In addition, the third optical waveguide 414 and the fourth optical waveguide 416 are formed on separate layers of another common two-layer hollow metal waveguide.

Thus, in comparison with the multi-layer waveguide system 300 in FIG. 3, the multi-layer waveguide system 400 in FIG. 4 includes optical waveguides 410-416 that have a fewer number of crossings.

Figure 5:
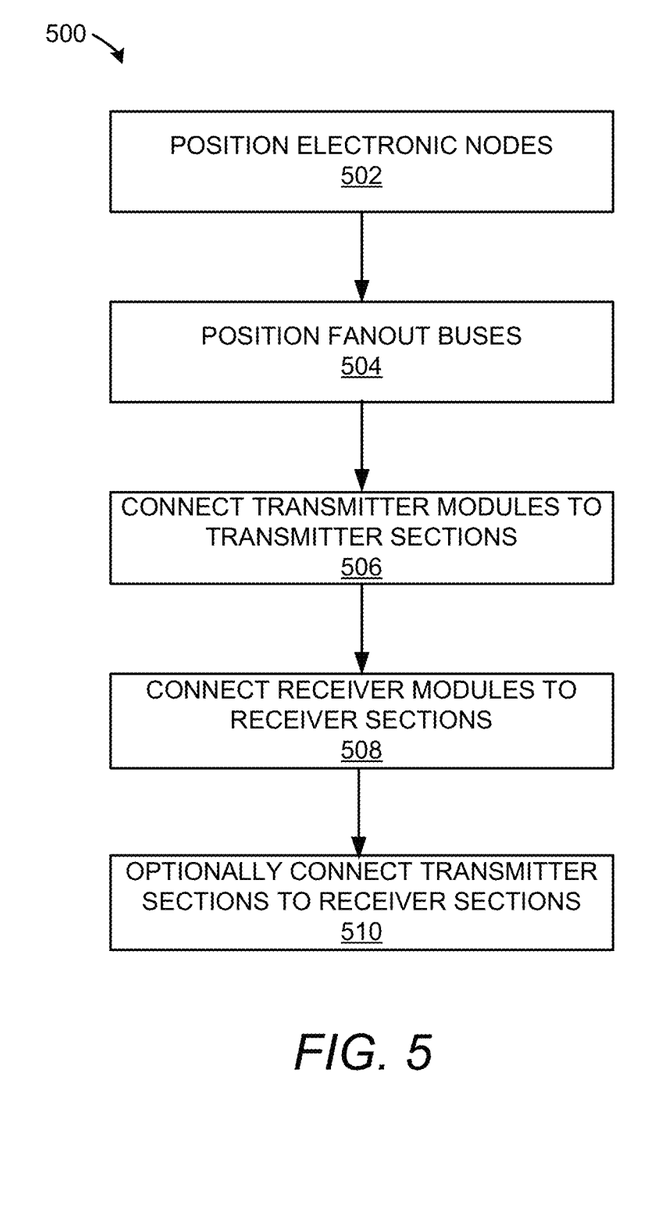
FIG. 5 illustrates a flow diagram of a method for implementing the electronic systems depicted in FIGS. 1, 2A and 2B, according to an embodiment of the invention.

Turning now to FIG. 5, there is shown a flow diagram of a method 500 for implementing the electronic systems 100, 200, and 250 depicted in FIGS. 1, 2A and 2B, according to an embodiment. It should be understood that the method 500 may include additional steps and that some of the steps described herein may be removed and/or modified without departing from a scope of the method 500.

At step 502, the plurality of electronic nodes 110a-110d are positioned with respect to each other. Thus, for instance, a plurality of compute nodes, such as servers, compute blades, etc., may be arranged in an electronics cabinet such that the compute nodes may be connected to a common backplane. In another example, a plurality of electronics cabinets may be arranged with respect to each other such that the compute nodes contained therein may be connected to a common backplane.

At step 504, the plurality of fanout optical buses 121a-121d, 212a-212d, 302-308, 402-408 are positioned with respect to the plurality of electronic nodes 110a-110d. Thus, for instance, the fanout optical buses 121a-121d, 212a-212d, 302-308, 402-408 may be positioned as a backplane of the electronic nodes 110a-110d.

At step 506, the transmitter modules 112 of the electronic nodes 110a-110d are connected to the transmitter sections 122, 214 of the fanout optical buses 121a-121d, 212a-212d, 302-308, 402-408 through respective optical fiber ribbons 140.

At step 508, the receiver modules 114-118 of the electronic nodes 110a-110d are connected to the receiver sections 224-228 of the fanout optical buses 121a-121d, 212a-212d, 302-308, 402-408 through respective optical fiber ribbons 142.

At step 510, the transmitter sections 222 of the fanout optical buses 212a-212d, 302-308, 402-408 are connected with a receiver section 216 of a respective fanout optical bus through respective optical fiber ribbons 240-246. Step 510 is considered optional because this step does not apply to the electronic system 100 depicted in FIG. 1.

Through implementation of the system and method disclosed herein, each of the electronic nodes is provided with its own dedicated fanout optical bus through which optical signals are sent to all of the electronic nodes connected to the fanout optical bus, which allows for all to all connectivity among the electronic nodes. In addition, the fanout optical buses are arranged to have relatively straight waveguide sections to thus enable communication of relatively strong optical signals through the fanout optical buses and for ease of manufacturing the fanout optical buses. Moreover, because the electronic nodes have common configurations, the electronic nodes may be arranged in an electronics rack in an arbitrary order and the costs associated with obtaining electronic nodes having different configurations are avoided.

What has been described and illustrated herein is an embodiment along with some of its variations. The terms, descriptions and figures used herein are set forth by way of illustration only and are not meant as limitations. Those skilled in the art will recognize that many variations are possible within the spirit and scope of the subject matter, which is intended to be defined by the following claims—and their equivalents—in which all terms are meant in their broadest reasonable sense unless otherwise indicated.

What is claimed is:

1. An electronic system comprising:
a plurality of electronic nodes, each of the electronic nodes comprising a transmitter module and a plurality of receiver modules, wherein the transmitter module is positioned at a same location with respect to the receiver modules in each of the electronic nodes; and
a plurality of fanout optical buses, each fanout optical bus comprising a transmitter section, a plurality of receiver sections, and at least one substantially straight optical waveguide extending between the plurality of receiver sections, wherein each transmitter section is optically connected to a transmitter module of a respective one of the electronic nodes, wherein the receiver sections of each of the fanout optical buses are optically connected to respective ones of the receiver modules of the electronic nodes to enable each of the electronic nodes to directly communicate with each of other ones of the electronic nodes through the plurality of fanout optical buses, and wherein at least one of the fanout optical buses is composed of a plurality of overlapping waveguides, wherein the overlapping waveguides enable the transmitter sections of at least two fanout optical buses to be located at a same location with respect to the receiver sections in their respective fanout optical buses.

2. The electronic system according to claim 1, wherein the transmitter sections of the plurality of fanout optical buses are connected to respective transmitter modules of the plurality of electronic nodes through respective optical fiber ribbons and wherein the plurality of receiver sections of the plurality of fanout optical buses are connected to respective receiver modules of the plurality of electronic nodes through respective optical fiber ribbons.

3. The electronic system according to claim 1, wherein the transmitter sections are located in a same location with respect to the plurality of receiver sections in each of the plurality of fanout optical buses.

4. The electronic system according to claim 3, wherein each of the plurality of fanout optical buses includes a first end and a second end and wherein each of the transmitter sections is located near the first ends of each of the plurality of optical buses such that optical signals from the transmitter sections are communicated in a single direction to each of the plurality of receiver sections along each of the plurality of fanout optical buses.

5. The electronic system according to claim 1, wherein the transmitter sections are located in different locations with respect to the plurality of receiver sections in each of the plurality of fanout optical buses.

6. The electronic system according to claim 5, wherein, in each of the plurality of fanout optical buses, the transmitter section is connected to the plurality of receiver sections through the at least one substantially straight optical waveguide.

7. The electronic system according to claim 5, wherein the at least one substantially straight waveguide extends along a substantially straight line substantially from one end to another end of each of the plurality of fanout optical buses.

8. The electronic system according to claim 1, wherein the plurality of electronic nodes comprise a plurality of computers.

9. The electronic system according to claim 1, wherein the plurality of electronic nodes comprise a plurality of electronics cabinets.

10. The electronic system according to claim 1, wherein the plurality of electronic nodes comprise identically configured electronic components with respect to each other.

11. A method for implementing an electronic system, said method comprising:
positioning a plurality of electronic nodes with respect to each other, wherein each of the electronic nodes comprising a transmitter module and a plurality of receiver modules, wherein the transmitter module is positioned at a same location with respect to the receiver modules in each of the electronic nodes;
positioning plurality of fanout optical buses with respect to the plurality of electronic nodes, each fanout optical bus comprising a transmitter section, a plurality of receiver sections, and at least one substantially straight optical waveguide extending between the plurality of receiver sections, wherein each transmitter section is optically connected to a transmitter module of a respective one of the electronic nodes, wherein the receiver sections of each of the fanout optical buses are optically connected to respective ones of the receiver modules of the electronic nodes to enable each of the electronic nodes to directly communicate with each of other ones of the electronic nodes through the plurality of fanout optical buses; and
connecting the transmitter sections of each of the fanout optical buses with a receiver section of a respective fanout optical bus through respective optical fiber ribbons.

12. The method according to claim 11, further comprising:
connecting the receiver modules of each of the plurality of electronic nodes to the receiver sections of respective fanout optical buses through respective optical fiber ribbons.

13. The method according to claim 11, further comprising:
connecting the transmitter modules of each of the plurality of electronic nodes to the transmitter sections of respective fanout optical buses through respective optical fiber ribbons.

14. An electronic system comprising:
a plurality of electronic nodes, each of the electronic nodes comprising a transmitter module and a plurality of receiver modules; and
a plurality of fanout optical buses, each fanout optical bus comprising a transmitter section, a plurality of receiver sections, and at least one substantially straight optical waveguide extending between the plurality of receiver sections, wherein the transmitter sections are located in a same location with respect to the plurality of receiver sections in each of the plurality of fanout optical buses, wherein each transmitter section is optically connected to a transmitter module of a respective one of the electronic nodes, wherein the receiver sections of each of the fanout optical buses are optically connected to respective ones of the receiver modules of the electronic nodes to enable each of the electronic nodes to directly communicate with each of other ones of the electronic nodes through the plurality of fanout optical buses, and wherein, in each of the plurality of fanout optical buses, the transmitter section is optically connected to one of the plurality of receiver sections through a fiber ribbon.

* * * * *